United States Patent
Depeige

(10) Patent No.: US 8,434,720 B2
(45) Date of Patent: May 7, 2013

(54) PRESSURISED AIRCRAFT DOOR EQUIPPED WITH A VENT FLAP

(75) Inventor: Alan Depeige, Tournefeuille (FR)

(73) Assignee: Airbus Operations SAS, Toulouse (FR)

( * ) Notice: Subject to any disclaimer, the term of this patent is extended or adjusted under 35 U.S.C. 154(b) by 353 days.

(21) Appl. No.: 12/863,667

(22) PCT Filed: Jan. 15, 2009

(86) PCT No.: PCT/FR2009/050052
§ 371 (c)(1),
(2), (4) Date: Jul. 20, 2010

(87) PCT Pub. No.: WO2009/092964
PCT Pub. Date: Jul. 30, 2009

(65) Prior Publication Data
US 2010/0294887 A1 Nov. 25, 2010

(30) Foreign Application Priority Data
Jan. 21, 2008 (FR) ..................... 08 50356

(51) Int. Cl.
*B64C 1/14* (2006.01)

(52) U.S. Cl.
USPC ..................................... 244/129.5

(58) Field of Classification Search ............... 244/129.4, 244/129.5, 118.3; 49/21
See application file for complete search history.

(56) References Cited

U.S. PATENT DOCUMENTS

| | | | | |
|---|---|---|---|---|
| 2,748,855 A * | 6/1956 | Siems et al. | ................. | 49/168 |
| 4,176,812 A * | 12/1979 | Baker | ..................... | 244/129.5 |
| 4,473,201 A * | 9/1984 | Barnes et al. | ............. | 244/129.5 |
| 4,497,462 A * | 2/1985 | Hamatani | .................. | 244/129.5 |
| 4,510,714 A * | 4/1985 | Kasper et al. | .................. | 49/249 |
| 4,758,030 A * | 7/1988 | Kupfernagel | .................. | 292/26 |
| 5,031,863 A * | 7/1991 | Noble | ....................... | 244/129.5 |
| 5,305,969 A * | 4/1994 | Odell et al. | ................. | 244/129.5 |
| 5,337,977 A | 8/1994 | Fleming et al. | | |
| 5,931,415 A * | 8/1999 | Lingard et al. | ............. | 244/129.5 |
| 6,454,210 B1 * | 9/2002 | Plattner | ...................... | 244/129.5 |
| 8,201,777 B2 * | 6/2012 | Wilson et al. | ............. | 244/129.5 |

FOREIGN PATENT DOCUMENTS

FR 2 686 568 A1 7/1993

* cited by examiner

*Primary Examiner* — Philip J Bonzell
(74) *Attorney, Agent, or Firm* — Oblon, Spivak, McClelland, Maier & Neustadt, L.L.P.

(57) ABSTRACT

The invention relates to a pressurized aircraft door that minimizes risk of ingress of precipitation inside the aircraft, while maintaining venting of the aircraft before unlocking the door. The purpose of the invention is achieved using a vent flap controlled by a door control member and designed such that the flap successively occupies the following positions during the opening movement of the control member: a closed position when the control member occupies a first end position putting the door in a closed/locked position; at least one partially open position before the door is in a closed/unlocked position; then once again in the closed position when the control member occupies a second end position putting the door in an open position.

10 Claims, 3 Drawing Sheets

PRESSURISED AIRCRAFT DOOR EQUIPPED WITH A VENT FLAP

TECHNICAL FIELD

The invention relates to a door designed to be fitted on a pressurised aircraft.

The aircraft door according to the invention may be used in particular to equip all aircraft exits designed for entry and exit of passengers, and also for service, passage of goods, etc.

STATE OF PRIOR ART

Aircraft doors need to satisfy many requirements particularly related to their mechanical strength, leak tightness and safety. Some of these requirements are also fixed by the international regulations in force.

For example, it is essential to prevent accidental opening of an aircraft door when the aircraft is in flight, particularly as a result of deliberate action by a passenger. The conventional way of achieving this is to use automatic locking devices electrically controlled from a plurality of signals indicating that the aircraft is in flight. For example, these signals may correspond to the "retracted" position of landing gears, the value of the internal pressure in the aircraft or operation of the engines. They can also depend on the pressure difference between the inside and outside of the aircraft, or the aircraft speed. However, there is a serious risk of these locking devices becoming frozen during prolonged cruising flight. Thus, it is normally recommended that they should be deactivated above a determined altitude and that they should be kept active below this altitude. They also need to be deactivated before landing to guarantee that the door will open in case of emergency. It is easy to understand that operation of this type of device is relatively complex, and that blocking of the device introduces a particularly severe safety risk. Furthermore, this device is dedicated solely to locking the door, which creates an additional mass that penalises aircraft performances.

Other problems are related to pressurisation of the aircraft or an aircraft compartment.

One of these problems is related to the residual pressure that may remain within the aircraft before the door is opened. This residual pressure may cause a sudden outwards movement of the door when it is opened, which can cause an accident to persons, particularly if the door is opened from outside the aircraft.

Furthermore, the internal pressure in the aircraft must normally be limited to a safe value, as long as the door is not completely closed and locked.

Document FR2686568 discloses an aircraft door fitted with a vent flap capable of closing an opening window. The door is designed such that firstly the door cannot be opened as long as the flap remains closed. Secondly, it is only possible to close the flap after the door has been closed and locked. Two control handles are then provided, one for the opening and closing control for the door and the other for operating the flap. These two handles are arranged such that the flap handle blocks the door handle in its closed and locked position, when the flap handle is in the closed position. Furthermore, when the door handle is in its open position, it blocks the flap handle in its open position.

However, some problems remain unsolved by this technical solution proposed up to now.

One of these problems relates to opening the vent flap. This flap is normally opened as soon as the door is unlocked and remains opened as long as the door is opened. The risk of ingress of precipitation (rain, snow) inside the aircraft, in other words the entry of precipitation through the opening window that is then not closed by the flap, is high. Precipitation can then freeze in or on the door opening and closing devices and consequently block the aircraft door. It is then no longer guaranteed that the door can be subsequently opened, possibly during an emergency.

PRESENTATION OF THE INVENTION

The purpose of this invention is to overcome the problem mentioned above and particularly to propose a pressurised aircraft door that minimises risks of ingress of precipitation inside the aircraft, while venting the aircraft before the door is unlocked.

To achieve this, the invention relates to a pressurised aircraft door comprising at least one door opening and closing control member designed to successively place the door in a closed/locked position, closed/unlocked position, and then in the open position during an opening movement between a first end position and a second end position approximately opposite to the first, at least one opening window normally closed by a vent flap, the control member being connected to the flap by a flap control member.

According to the invention, said flap control member is controlled by said control member and is designed such that the flap occupies the following positions in sequence during the opening movement of the control member:

a closing position of said opening window when the control member occupies its first end position putting the door in its closed/locked position;

an at least partially open position before the door is in its closed/unlocked position;

then once again the closing position of said opening window when the control member occupies its second end position putting the door in its open position.

Thus, the invention effectively minimises the risks of the ingress of precipitation inside the aircraft, while venting the aircraft before the door is unlocked. When the door is in its open position, the flap is in a closing position of said opening window so as to prevent the ingress of any precipitation inside the aircraft. Furthermore, when the door is opened and before the unlocking step, the flap is in an open position in which the aircraft is vented. Any risk of sudden opening of the door under the effect of residual pressure is thus avoided.

Preferably, the flap is in a maximum opening position when the control member is in an intermediate position, said intermediate position being located between the first end position and the second end position, putting the door in its closed/unlocked position.

Preferably, the flap opens progressively during the opening movement of the control member between the first end position and the intermediate position.

Preferably, the flap closes progressively during the opening movement of the control member between the intermediate position and the second end position.

Advantageously, the flap occupies its closing position of said opening window before the control member moves into its second end position putting the door in its open position. Thus, when positioning the control member in its second end position, a closing force is applied to the flap that tends to close the flap even more which improves the closing seal of the opening window by the flap.

Preferably, the flap control member is designed such that when the control member is approximately in its first end position and the flap is approximately in its closing position, a pressure force applied to the flap in the flap closing direction due to the internal pressure in the aircraft exceeding the external pressure creates a closing moment applied to the control member oriented such that the control member is held in its first end position.

Thus, when the aircraft is pressurised and the pressure inside the aircraft is greater than the external pressure, particularly in flight and particularly at high altitude, the pressure difference generates a large force on the flap that is transmitted directly to the control member so as to hold it in its first end position. Thus, the differential pressure prevents any movement of the control member and holds the door in its closed/locked position. This prevents any deliberate or accidental opening of the aircraft door during these flight conditions.

The invention also has another advantage that avoids firstly the use of locking means dedicated to locking the door in flight, and secondly to eliminate the need to use a specifically designed handle to operate the flap. This satisfies the requirement to save mass, which is essential for aircraft performances.

Preferably, the rotation axis of the flap is approximately at one end of the flap and said pressure force applied to the flap creates a pressure moment about said axis of rotation, with said closing moment applied to the control member being greater than said pressure moment. Thus, the pressure force due to the pressure difference on the flap is amplified and transmitted directly to the control member.

It is advantageous if the control member includes a gear in order to amplify the pressure force applied to the control member flap.

In one embodiment of the invention, the flap contains an observation window.

It is also advantageous if the door comprises a plurality of normally closed opening windows each closed by a vent flap. Thus, the area through which the aircraft is vented is increased. This reduces the time necessary to equalise internal and external pressures, thus optimising the minimum door opening time.

Other advantages and characteristics of the invention will become clear from the following detailed and non-limitative description.

BRIEF DESCRIPTION OF THE DRAWINGS

We will now describe embodiments of the invention through non-limitative examples with reference to the appended drawings in which.

DETAILED PRESENTATION OF A PREFERRED EMBODIMENT

Figure 1:
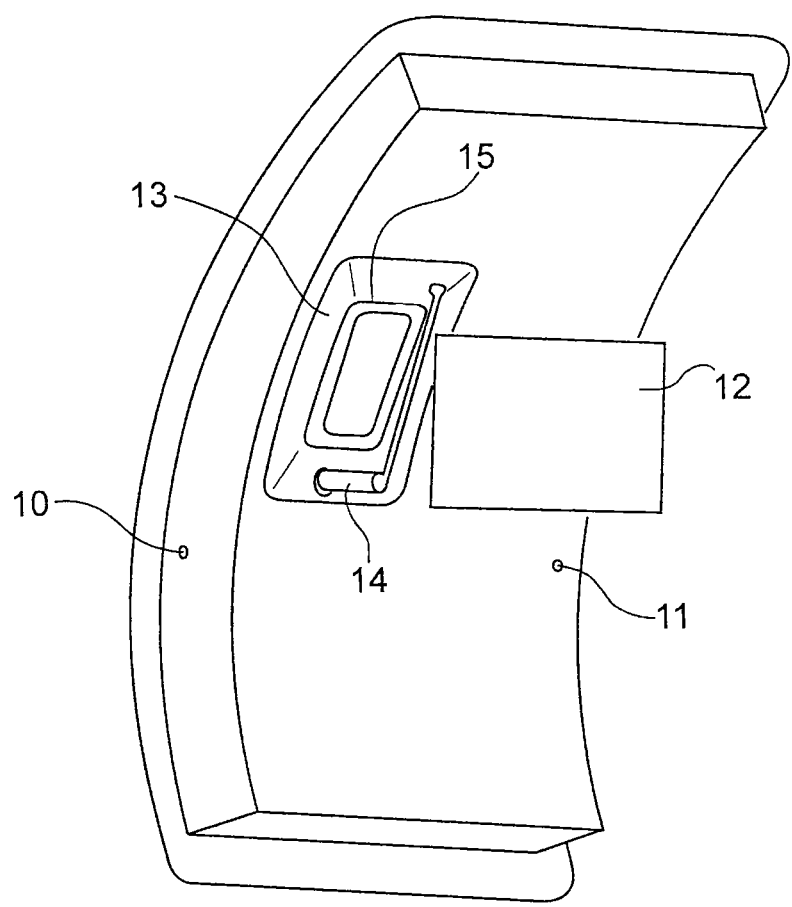
FIG. 1 is a perspective view diagrammatically showing a pressurised aircraft door according to the invention, as seen from inside the aircraft.

FIG. 1 diagrammatically shows an aircraft door more specifically intended for use by passengers to enter a pressurised aircraft. However, this type of door is only an example because as already mentioned, the invention is indifferently applicable to all types of aircraft entry or exit doors, regardless of whether these doors are intended for use by passengers, service personnel, baggage, etc.

The door shown in FIG. 1 comprises a single piece door structure denoted as reference 10, and a frame structure (not shown). An inside cladding 11 is provided that covers the door structure 10.

The door structure 10 comprises stops (not shown) on its lateral part that bear on facing stops connected to the frame structure, when the door is in its closed and locked position. This characteristic transfers pressure loads from the door structure 10 to the frame structure, and then to the aircraft fuselage. In other words, the stops formed on the lateral part of the door structure 10 are forced towards the outside of the aircraft into contact with stops fitted to the frame structure, under the effect of the pressure difference that exists in flight between the inside of the aircraft and the external atmosphere.

The door structure 10 is provided with door opening and closing means that determine the kinetics followed by this door structure 10 when it is opened and closed and that lock it on the door frame when the door is closed. These opening and closing means are not shown in FIG. 1, because they do not form part of the invention and their forms may vary depending on the manufacturer.

As a non-limitative example, the kinetics followed by the door structure 10 when it is opened may follow several successive phases. Thus, during a preparatory phase in which the stops fitted on the door structure 10 separate from the stops fitted on the frame structure, the door structure 10 moves very slightly backwards (for example about 2 mm) towards the inside of the aircraft. After this initial backwards movement, the door structure 10 moves upwards along a curved path over a distance such that the door structure stops can move away from the frame structure stops. Finally, the door structure moves away from its frame structure and moves both outwards and forwards along the aircraft following a circular translation movement determined particularly by the support arm 12.

In the embodiment shown in the figures, the door opening and closing means may be activated either from inside the aircraft using the internal control handle 14 of the door, or from outside the aircraft using an external control handle (not shown). The external control handle is normally housed in a recess formed in the outside surface of the door structure 10. The external control handle is then engaged on the shaft that carries the internal control handle through a gear or a set of connecting rods and levers installed on shafts. Only the internal control handle 14 will be considered in the remainder of the description. However, the invention is not limited to actuation of the flap 15 by the internal control handle 14, but is applicable to any door opening and closing control member that also controls the flap control member 15. Thus, the external control handle is within the scope of the invention, since it controls the flap control member 15.

According to the invention, the door structure 10 comprises at least one opening window 13 passing through the inner cladding 11 and the entire thickness of the door structure 10, for example located close to the internal control handle 14. This opening window 13 is normally closed and sealed by the aircraft vent flap 15. The flap 15 is hinged on the door structure 10 and opens inwards into the aircraft. FIG. 1 shows an approximately rectangular flap 15 oriented vertically. Other forms and arrangements are possible, for example an approximately rectangular-shaped horizontal flap, located in the upper part of the door structure 10. The flap 15 may contain an observation window through which an operator can observe the outside of the aircraft, for example before it is opened to prevent any accident.

Figure 2:
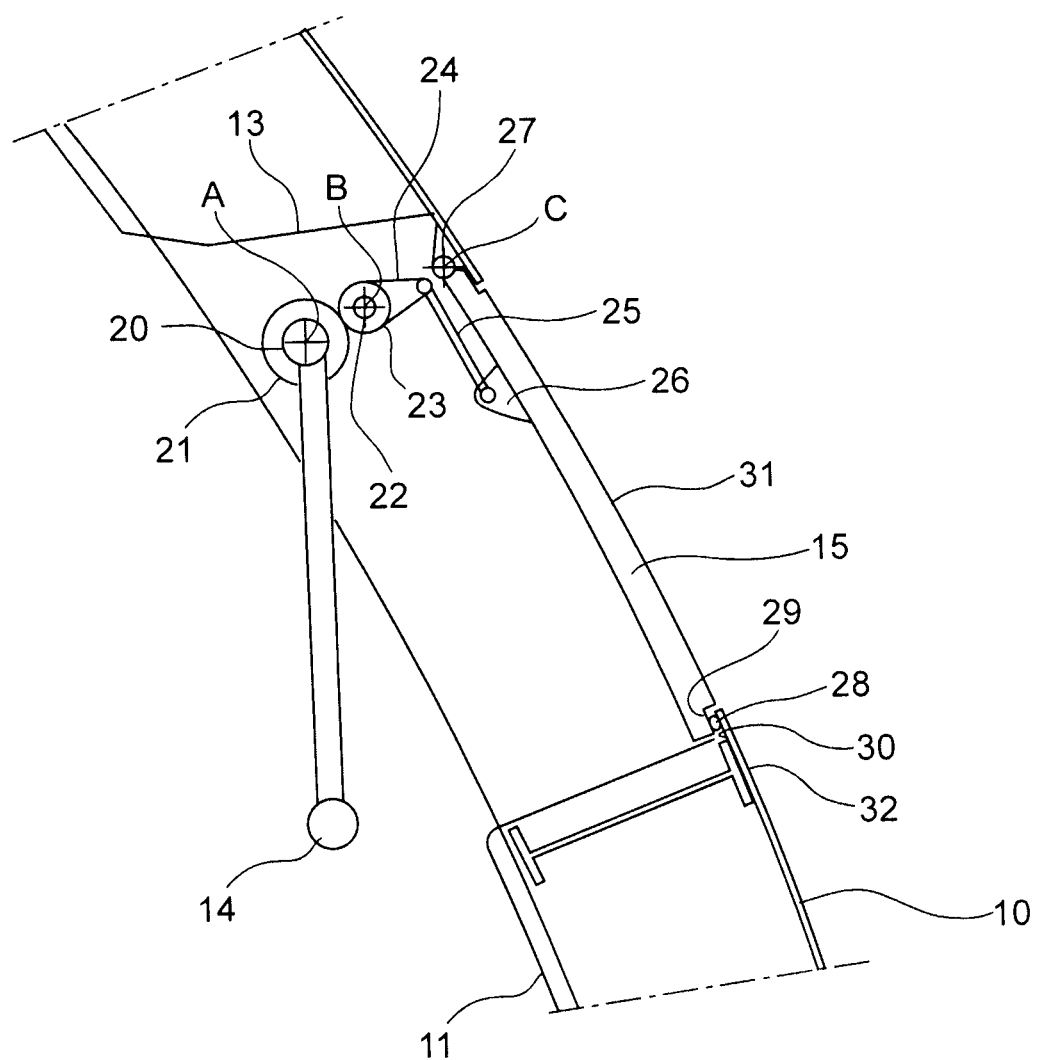
FIG. 2 is a sectional view on a vertical plane diagrammatically showing part of the door in FIG. 1.

We will now describe the flap control member in detail with reference to FIG. 2. The internal control handle 14 of the door is supported by the door structure 10 free to rotate about a first approximately horizontal axis A when the aircraft trim is horizontal. The internal control handle 14 can be in two end positions opposite to each other, and an intermediate position that may be located at approximately mid-distance between the two end positions. In the first end position, the internal control handle 14 is located approximately at the bottom, under the height of the axis A, and is in the closed/locked state of the aircraft door. In the second end position, the internal control handle 14 is approximately at the top, above the height of the axis A, and corresponds to the door open state. The angle measured at the axis A and formed by the internal control handle 14 in the first end position and the handle 14 in its second end position may be of the order of 120 degrees. Note that in its opening movement between the first end position and the second end position passing through the intermediate position, the internal control handle 14 successively puts the door into a closed/locked position, a closed/unlocked position and then into an open position. More precisely, as described above, in the closed/locked position the stops of the lateral part of the door bear on the facing stops fixed to the frame structure. In the closed/unlocked position, the structure of the door has moved very slightly backwards towards the inside of the aircraft and the door stops are no longer in contact with the frame structure stops. The door can then move upwards along a curved path so as to move the door structure stops away from the frame structure stops. Finally, in its open position, the door has completed its outwards and forwards movement. The opening is then clear so that personnel or equipment can enter or exit.

The internal control handle 14 rotates a shaft 20 about an axis A. The shaft 20 supports a gearwheel that engages on another gearwheel 23. This gearwheel 23 is supported by an articulated shaft 22 on an axis B parallel to A, and is mounted on the door structure 10. Axis B is approximately at the same level as A, but it is offset towards the outside of the aircraft from axis A.

A lever 24 is installed fixed to the shaft 22 and it is connected at its end opposite the shaft 22, to one end of a control rod 25. The other end of the control rod 25 is connected to a bearing 26 fixed to the flap 15.

The vent flap 15 closes the opening window 13. It may be installed free to rotate on the door structure 10 through a hinge 27, the axis C of which is oriented parallel to the A and B axes. The flap 15 is designed so that it occupies a closing position blocking off the window, and an open position. In the closed position, the flap 15 closes and seals the opening window 13 of the door structure 10. The opening window 13 is made leak tight when closed by providing a seal 28 on the flap 15 placed on the outside edge 29 of the flap 15 so that it comes into contact with the inside edge 30 of the opening window 13. More precisely, the outside part 31 of the flap 15 comprises a recess 31 around its periphery into which the seal 28 fits. The depth of the recess along the direction of the thickness of the flap is defined such that when the flap 15 is in the closed position, the outside part 31 of the flap 15 is in line with the outside edge 32 of the opening window 13. This assures that the flap 15 is aerodynamic when it is in the closed position. The flap 15 may occupy an open position in which the outside edge 29 of the flap 15 is no longer in contact with the inside edge 30 of the opening window 13. The open position of the flap 15 allows an airflow to pass through the opening window 13 so as to balance the pressures inside and outside the aircraft.

The opening action of the internal control handle 14 will now be described with reference to FIGS. 3A to 3C.

Figure 3A:
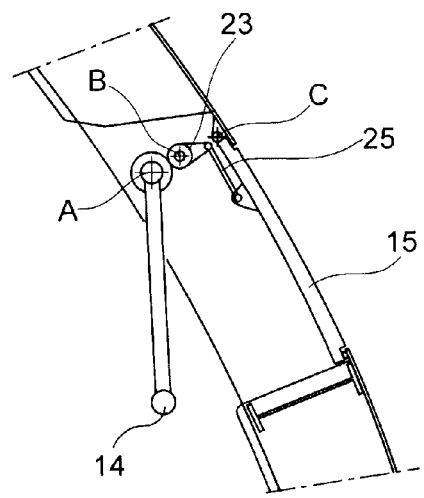
FIGS. 3A to 3C are sectional views showing the part of the door in FIG. 2 for three positions of the door control member.

As shown in FIG. 3A, the internal control handle 14 that initially occupied the first end position in which the door is put in the closed/locked position, is arranged very close to the door structure 10 below the axis A. In this state, the flap closes the opening window 13 when there is a residual pressure inside the aircraft, in other words the pressure inside the aircraft is greater than the outside pressure, the flap 15 is subjected to a pressure force that tends to hold it closed and keeps the internal control handle 14 in the first end position. When the pressure difference between the inside and outside of the aircraft is not too high, for example less than 0.25 psi, the pressure force applied on the flap 15 does not exceed a value making it impossible to move the handle 14 to the open position.

In this case, when an operator activates the internal control handle 14 in order to open the aircraft door, he applies a force on the handle 14 so as to rotate the handle 14 about axis A in the clockwise direction as shown in FIG. 3A. The handle 14 leaves the first end position in which the door is placed in a closed/locked position, and rotates about the axis A towards the intermediate position. The gearwheel 21 rotates about the axis A in the clockwise direction as shown in FIG. 3A and rotates the gearwheel 23 about axis B in the anti-clockwise direction. The gearwheel 23 applies an upwards force on the control rod through the lever 24, which tends to rotate the flap 15 about the axis C, through the bearing 26. The flap 15 opens progressively as the control handle 14 follows its opening movement between the first end position and the intermediate position.

Figure 3B:
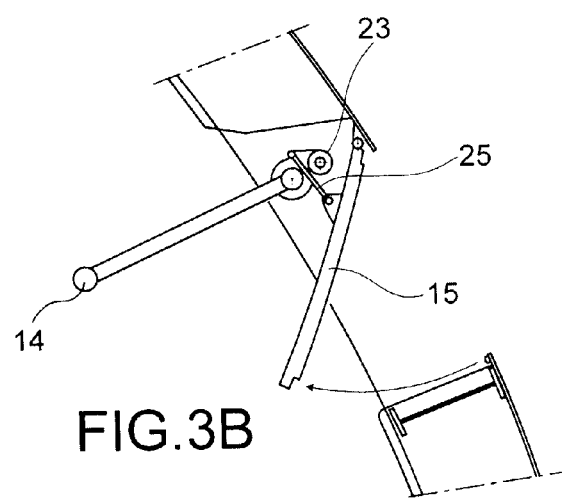

In FIG. 3B, the internal control handle 14 is in the intermediate position thus putting the door in its closed/locked position. The intermediate position may be located at approximately mid-distance between the first end position and the second end position. The lever 24 is oriented approximately upwards and towards the inside of the aircraft, thus putting the flap 15 in the maximum open position. The control handle 14 then leaves the intermediate position and rotates towards the second end position. The gearwheel 23 rotates, transmitting a closing force to the flap 15. The flap then closes progressively.

Figure 3C:
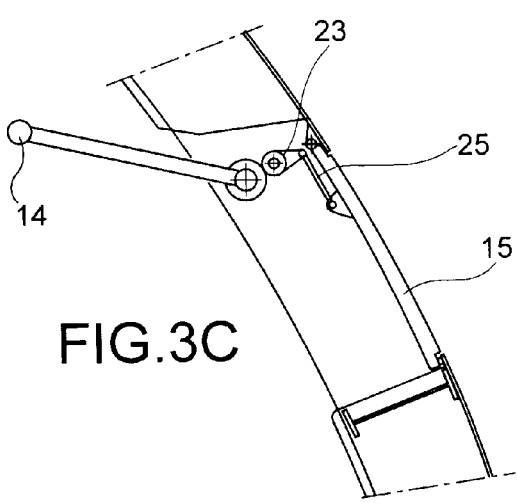

In FIG. 3C, the internal control handle 14 occupies the second end position, thus putting the door in its open position. The flap 15 then occupies its closing position of the opening window 13. Finally, the flap 15 may be in its closing position before the handle 14 is in the second end position. Thus, the force applied to the control handle 14 to put the handle 14 in its second end position is transmitted to the flap 15 so as to apply a closing force that improves the seal of the closing window 13.

Conversely, when an operator moves the control handle 14 so as to close the door, the control handle leaves the second end position to reach the first end position passing through the intermediate position. The closing movement of the handle 14 then follows the same rotation movement as it followed during the opening movement, except in the inverse direction. Similarly, the flap 15 follows the movement described above but in the inverse direction.

However, note that the flap 15 only occupies its closing position of the window 13 when the control handle 14 is in its first end position putting the door in its closed/locked position. When the handle 14 is in a position between its intermediate position and its first end position, with the door closed but not locked, the flap 15 remains at least partially opened. This avoids the risk of excessive internal pressure of the aircraft as long as the door is not reliably closed and locked.

In one embodiment of the invention, the sizes of the internal control handle 14, the flap control member and the flap 15 are chosen such that the flap 15 can be used as an auxiliary means of increasing the manoeuvre force of the internal door control handle 14 if the aircraft is pressurised. One non-limitative example of the design of the flap control member 15 will now be described with reference to FIG. 2.

It is assumed that the flap 15 is in the closing position and the internal control handle 14 is in its first end position. The pressure Pi inside the aircraft is assumed to be greater than the external pressure Pe. The radii of gearwheels 21 and 23 are denoted r1 and r2 respectively. The length of the lever arm connecting the internal control handle 14 to the shaft 20 is denoted a. The lever 24 is length b. The length of the lever arm formed by the distance separating the axis of the hinge 27 and the end of the control rod 25 connected to the lever 24 is denoted c.

The pressure force applied on the flap is $S \cdot \Delta P$, where S is the area of the flap and $\Delta P = Pi - Pe$ is the pressure difference. This pressure force applied at a distance d from the axis of the hinge 27 creates a moment $S \cdot \Delta P \cdot d$ that holds the flap in the closing position. Moving the internal control handle 14 from the first end position to the second end position causes a rotation movement of the lever 24 in the clockwise direction as shown in FIG. 2 relative to axis B. Rotation of the lever 24 applies an opening force Fb through the control rod 25. This force Fb with lever arm c creates a flap opening moment $Fb \cdot a$ applied to the bearing 26 about the axis of the hinge 27. The flap opening condition is written as $Fb \cdot c = S \cdot \Delta P \cdot d$. This force Fb creates an opening moment $Me2 = Fb \cdot b$ on the gearwheel 23 through the lever 24. The moment applied to the gearwheel 21 is $Me1 = Fb \cdot b \cdot r1/r2$. The actuation force $\Delta L$ to be exerted on the internal control handle 14 must then be $\Delta L = Me1/a$. Thus, the actuation force is written:

$$\Delta L = S \cdot \Delta P \cdot d/c \cdot r1/r2 \cdot b/a$$

This opening actuation force $\Delta L$ depends on the pressure difference $\Delta P$. It is added to the actuation force L corresponding to the force necessary to activate the internal control handle 14 if there is no pressure difference. This force L is essentially due to friction of the door on the frame structure, particularly friction of the seal 28 in contact with the internal edge 30 of the opening window 13, and friction between the door stops and the frame structure stops. It is of the order of 180N for $\Delta P \approx 0$. The total opening actuation force is $TL = L + \Delta L$.

The size of the flap control member 15 must enable firstly alternating rotation of the flap 15 when opening controlled by the internal control handle 14, and secondly must satisfy regulatory requirements concerning the opening actuation force to be provided if there is or is not a pressure difference.

For example, for the following values:
S=0.05 m² c=0.02 m r1=0.06 m
a=0.36 m d=0.2 m r2=0.04 m
b=0.035 m
the result obtained is:

$$TL \approx 180 + 0.073 \Delta P$$

Some regulatory requirements can then be respected. If there is no pressure difference, the force to be applied to open the door should not exceed 200N. It must also be possible to open the door in an emergency situation with a maximum force of 334N when the pressure difference LP in the aircraft is of the order of 0.25 psi. Finally, it is also required that it should be impossible to open the door in flight if there are no dedicated means for locking the door. To achieve this, the opening force must be of the order of 1360N for a pressure difference of 2 psi. For the example design according to the invention, the force necessary to open the control handle 14 of the flap 15 is:

TL≈180N for $\Delta LP \approx 0$ psi
TL≈306N for $\Delta P \approx 0.25$ psi
TL≈1200N for $\Delta P \approx 2$ psi Thus, the flap control member can achieve alternate rotation of the flap 15 when the internal control handle is opened, and secondly it satisfies regulatory requirements about the value of the opening force of the internal aircraft door control handle.

In the preferred embodiment of the invention described above, the flap control member 15 comprises a gear comprising two gearwheels 21 and 23. However, any other mechanical device capable of alternately rotating the flap 15 about its axis C could be used during the opening movement of the internal control handle 14, without going outside the framework of the invention. For example, a cranked rod system associated with a guide that can transform the rotating movement of the crank into an alternating back and forth translation movement could also be used. However, the gear system 21, 23 used in the preferred embodiment is an endly reliable solution because there is no risk of it getting jammed in the intermediate position, for example due to jamming of a mechanical part.

In one embodiment of the invention not shown, a plurality of opening windows 13 is provided and placed in the door in parallel to each other. Each opening window 13 is normally closed by a flap 15 and opens by rotation about an axis parallel to axes A and B. Each flap 15 is connected to the control member, itself actuated directly through the internal control handle. Thus each flap moves in a manner similar to the flap 15 described in the preferred embodiment of the invention and represented particularly in the figures.

The invention claimed is:

1. A pressurized aircraft door comprising:
    at least one door opening and closing control member designed to successively place the door in a closed/locked position, closed/unlocked position and then in the open position during an opening movement between a first end position and a second end position,
    at least one opening window normally closed by a vent flap, the control member being connected to the flap by a flap control member,
    said flap control member configured to be controlled by said control member, and is designed such that the flap occupies the following positions in sequence during the opening movement of the control member:
        a closing position of said opening window when the control member occupies its first end position putting the door in its closed/locked position;
        an at least partially open position before the door is in its closed/unlocked position;
        then once again the closing position of said opening window when the control member occupies its second end position putting the door in its open position,
    wherein the second end position is different from the first end position.

2. The pressurized aircraft door according to claim 1, wherein the flap occupies its closing position of said opening window before the control member moves into its second end position putting the door in its open position.

3. The pressurized aircraft door according to claim 1, wherein the control member comprises a gearwheel.

4. The pressurized aircraft door according to claim 1, wherein the flap contains an observation window.

5. The pressurized aircraft window according to claim 1, wherein the door comprises a plurality of opening windows each normally closed by a vent flap.

6. The pressurized aircraft door according to claim 1, wherein the flap is in a maximum opening position when the control member is in an intermediate position, said intermediate position being located between the first end position and the second end position, putting the door in its closed/unlocked position.

7. The pressurized aircraft door according to claim 6, wherein the flap opens progressively during the opening movement of the control member between the first end position and the intermediate position.

8. The pressurized aircraft door according to claim 6, wherein the flap closes progressively during the opening movement of the control member between the intermediate position and the second end position.

9. The pressurized aircraft door according to claim 1, wherein said flap control member is designed such that when the control member is approximately in its first end position and the flap is approximately in its closing position, a pressure force applied to the flap in the flap closing direction due to the internal pressure in the aircraft exceeding the external pressure creates a closing moment applied to the control member and oriented so as to force the control member to be in its first end position.

10. The pressurized aircraft door according to claim 9, wherein the flap with a rotation axis approximately at one end of the flap and said pressure force applied to the flap creating a pressure moment about said axis of rotation, said closing moment applied to the control member being greater than said pressure moment.

* * * * *